United States Patent [19]
Martin

[11] 3,923,376
[45] Dec. 2, 1975

[54] ELECTRO-OPTIC WAVEGUIDE BEAM DEFLECTOR

[75] Inventor: William E. Martin, San Diego, Calif.

[73] Assignee: The United States of America as represented by the Secretary of the Navy, Washington, D.C.

[22] Filed: Aug. 2, 1974

[21] Appl. No.: 494,132

[52] U.S. Cl. .................. 350/96 WG; 350/160 R
[51] Int. Cl.² ........................................ G02B 5/14
[58] Field of Search ............... 350/96 WG, 160 R

[56] References Cited
UNITED STATES PATENTS
3,464,762  9/1969  Kahng .................. 350/96 WG X
3,837,827  9/1974  Carruthers et al. ...... 350/96 WG X

OTHER PUBLICATIONS
Cheo "Pulse Amplitude Modulation of a $CO_2$ Laser in an Electro-Optic Thin-Film Waveguide" Applied Phys. Lett., Vol. 22, No. 5, Mar. 1973, pp. 241–244.
Martin et al., "Optical Waveguides by Diffusion in II–VI Compounds" Appl. Phys. Lett., Vol. 21, No. 7, Oct. 1972, pp. 325–327.

*Primary Examiner*—John K. Corbin
*Attorney, Agent, or Firm*—R. S. Sciascia; G. J. Rubens; J. W. McLaren

[57] ABSTRACT

An electrically conductive substrate supports a multimode optical waveguide of electro-optic material which transmits polarized light energy along a determinable path. The electro-optic material varies in electrical resistivity as a function of its thickness, with top and bottom electrodes disposed to develop an electric field across the thickness of the electro-optic material in response to an applied electrical potential. A correlative variation in refractive index is thus caused across the thickness of the electro-optic material commensurate with its variation in electrical resistivity. The plane wave of light energy travelling along the light path of the optical waveguide is consequently changed in orientation as a function of the applied electrical potential producing a concomitant deflection of the emergent light energy. An appropriate optical lens may be used for concentrating such emergent light energy at a desired focal plane in the form of a line or a point.

7 Claims, 1 Drawing Figure

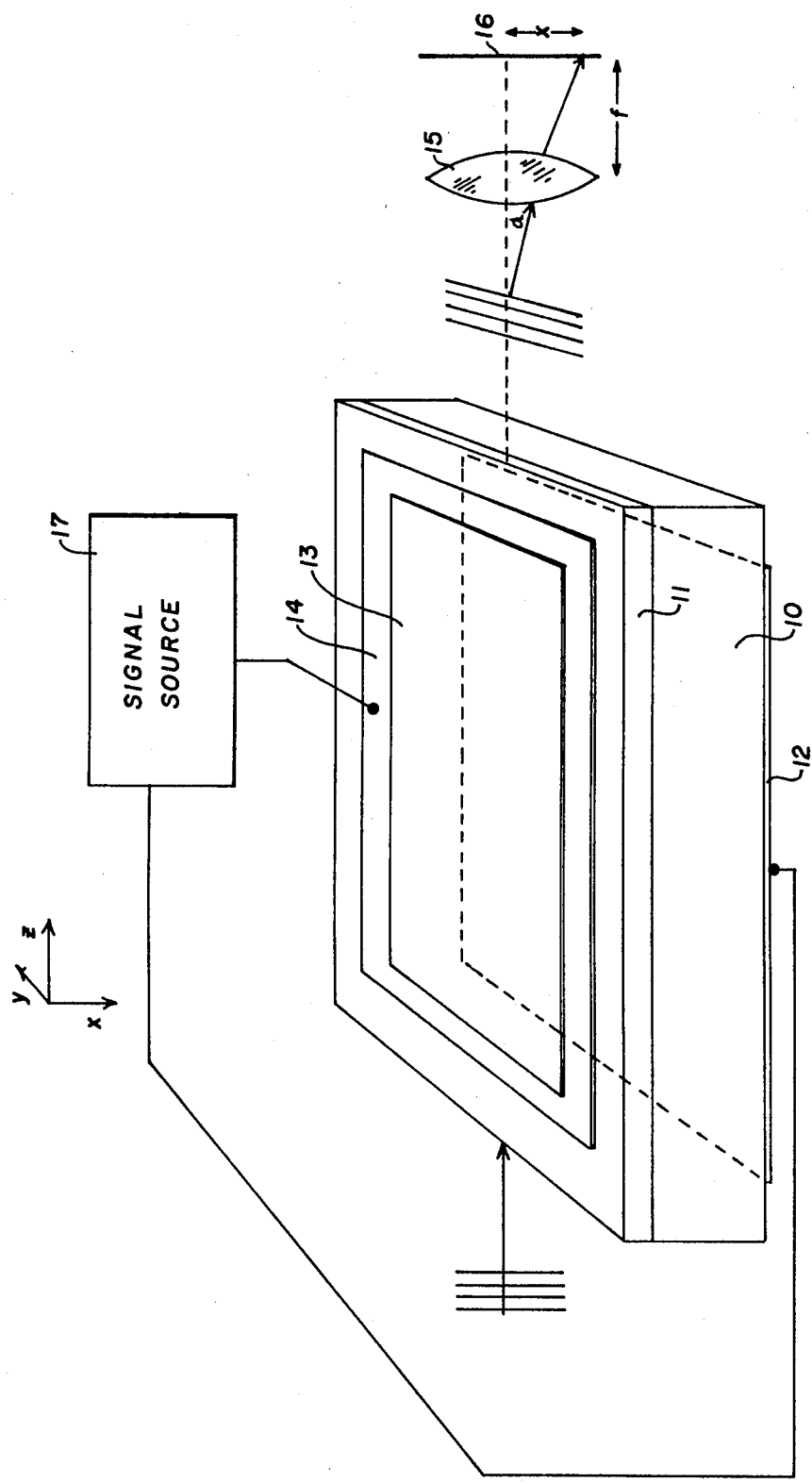

ELECTRO-OPTIC WAVEGUIDE BEAM DEFLECTOR

BACKGROUND OF THE INVENTION

Bulk crystal optical beam deflectors have been known for some years as is evidenced by the scientific article published by F. S. Chen in 1970 in the Proceedings of IEEE, Volume 58, beginning at page 1440. Optical waveguide beam deflectors, however, are much less well known having been more recently disclosed in scientific articles appearing in 1972 authored by F. R. Gfeller and C. W. Pitt in Electronics Letters, Volume 8, beginning at page 549 and the disclosure of M.A.R.P. de Barros and M. G. F. Wilson in the Proceedings of IEEE, Volume 119, beginning at page 807.

Many prior art waveguide deflectors involved acoustic surface wave interactions with an optical beam transmitted in a waveguide and are inherently relatively slow in operation due to the time which is necessarily required to generate an acoustical signal as disclosed in the referenced Gfeller et al article.

Other prior art electro-optic waveguide deflector systems have employed a grating or inter-digital electrode structure on a planar optical waveguide as disclosed in the de Barros et al article. However, such inter-digital electrodes have an inherently high capacitance and since the optical beam is necessarily confined to a plane, the degree or amount of deflection which results for a given applied electrical potential is relatively low.

Accordingly, it is highly desirable that an optical beam deflection system be devised which is significantly more efficient in operation than known prior art concepts.

Additionally, the need exists for an improved optical beam deflection system which is inherently capable of relatively very large deflections of the optical beam in response to small applied electrical potential signals.

SUMMARY OF THE INVENTION

The waveguide optical beam deflector of the present invention uses the properties of a variable resistivity with an electrooptic crystal to produce beam deflection by variation in the electro-optic effect produced within the waveguide region in response to known or determinable magnitude variations in the electrical potential of an applied signal source.

In its most fundamental form the optical beam deflector of the present invention may comprise an electrically conductive substrate supporting an optical waveguide comprised of electro-optic crystal material for multi-mode transmission of polarized light energy along the optical path defined by the waveguide. The electro-optic crystal material has a variation in its resistivity as a function of its thickness; or, stated in another way, the electrical conductivity of the electro-optic crystal material varies in relation to its thickness.

A top electrode and a bottom electrode are disposed to develop an electric field across the thickness of the electro-optic crystal material in response to applied electrical potential signals. Because of the variation in electrical resistivity relative to thickness of the electro-optic crystal material, there is a resultant commensurate variation in intensity of the electric field developed. Since the electro-optic property of the crystal material causes its refractive index to change in response to the intensity of the electric field at each point within the electro-optic crystal structure, a variation in refractive index will be produced within the electro-optic crystal material relative to its thickness.

Accordingly, polarized light energy transmitted along the optical waveguide of the electro-optic crystal material will undergo a change of orientation of plane wave as a function of the applied electrical potential. The emergent light energy may, if desired, be intercepted by an appropriate positive focal lens, for example, for concentration at a desired focal plane either in the form of a line or point.

In a preferred embodiment of the present invention the electrodes may comprise an electrically conductive metallic film, for example, deposited on the top and bottom of the structure. The bottom electrode may be deposited directly on the substrate. If desired, an optical buffer layer of suitable material may be disposed between the top electrode and the optical waveguide.

In accordance with the concept and teaching of the present invention, the electro-optic crystal material of the optical waveguide portion of its structure may be deposited on the substrate, diffused into the substrate, or ion-implanted in the substrate by an appropriate selected technique within the present state of the art, including proton bombardment.

Accordingly, it is a primary object of the present invention to provide an improved optical beam deflector capable of extremely high speed operation.

Another most important object of the present invention is to provide such an optical beam deflector which is inherently more efficient in its deflection operation than known conventional techniques.

Yet another important object of the present invention is to provide such an optical beam deflector which is capable of relatively very large deflections in response to relatively small applied electrical signals.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWING

The drawing is a greatly enlarged representation of a typical embodiment of the present invention.

DESCRIPTION OF THE PREFERRED EMBODIMENT

The drawing shows an embodiment of the present invention which comprises an electrically conductive substrate element 10 supporting a multi-mode optical waveguide 11 of electro-optic crystal material for transmitting polarized light energy along a determinable path as indicated generally by the arrow to the left of the illustration.

In accordance with the concept of the present invention the electro-optic crystal material of the optical waveguide 11 is required to exhibit a change in its optical characteristics in response to an applied electric field. The electro-optic crystal material of the optical waveguide 11 has a variation in electrical resistivity as a function of its thickness. That is to say that the electrical resistivity of the electro-optic crystal material 11 may vary, for example, as a gradient from its greatest electrical resistivity at one surface of its thickness to its least electrical resistivity at the other surface of its thickness.

Such desired variation in electrical resistivity relative to the thickness of the electro-optic crystal material may be affected in a number of ways. Resistivity variations can be produced in optical waveguides (diffused or epitaxial layers) of ZnS, CdS, ZnSe, CdSe, ZnTe, CdTe, GaAs, GaAlAs, GaP, and GaAsP (all cubic or hexagonal electro-optic crystals). Diffusions can produce error function or Gaussian profiles in resistivity in the simplest lasers, while doping a thin film waveguide layer (such as deposited on GaAs) during deposition can produce any resistivity profile desired. All of these materials are suitable for this invention.

Any binary or ternary semiconductor material may be used in which it is possible to fabricate multi-mode waveguides. Diffusion processes may also be used to produce waveguide resistivity variations in pervoskite crystals such as lithium niobate. Ion implantation, electron bombardment, and dopant variations during film growth may also be used to fabricate an optical waveguiding layer with a varying resistivity profile.

A bottom electrode 12 of electrically conductive material, such as metallic film, may be deposited on the underside of the substrate 10. A top electrode 13, similarly electrically conductive, is disposed over the optical waveguide 11 to include the electro-optic crystal material between the two electrodes 12 and 13, so that when an electrical potential is applied to the electrodes, a resultant electric field is developed therebetween.

If desired, an optical buffer layer 14 may be disposed between the top electrode 13 and the electro-optic crystal material of the optical waveguide 11 to minimize light losses.

In operation, the plane wave of the input light energy in the form of a polarized light beam may be directed to the optical waveguide beam deflector of the present invention from the left-hand side of the illustrative drawing as indicated by the arrow. The polarization of the plane wave of the input light energy is represented by the multiple vertical lines which intersect the arrow. Such a beam of polarized light energy enters the optical waveguide 11 of electro-optic crystal material for multimode transmission therethrough. A multi-mode optical waveguide has optical dimensions such that many modes of light energy are propagated simultaneously along its path.

When controllably variable electrical potential source 17 is applied to the bottom and top electrodes 12 and 13, respectively, an electric field is developed through the electrically conductive substrate material 10 and the optical waveguide 11. Due to the variation in electrical resistivity of the electro-optic crystal material of the optical waveguide 11, however, the electric field also has a variation commensurate with the non-uniform electrical resistivity.

The electro-optic properties of the optical waveguide 11 respond to the electric field to develop a variation in change of refractive index commensurate with the intensity of the electric field as it varies in response to the variation of electrical resistivity.

Accordingly, when the plane wave of input light energy traverses the optical waveguide 11, it undergoes a change in orientation due to the variation of refractive index which has been generated as a function of thickness of the electro-optic crystal material of the optical waveguide 11. Consequently, when the plane wave of light energy emerges from the optical waveguide 11 it has undergone a change in orientation as represented by the multiple lines crossing the arrow on the right-hand side of the illustration of the drawing which indicate a change from the vertical orientation of the plane wave front and deflection of the light energy at an angle $\alpha$.

As will be appreciated by those skilled and knowledgeable in the pertinent arts, the deflection of light energy thus given effect is not a static one but may be varied as desired as a function of the electrical potential applied to the two electrodes 12 and 13. Thus, when no electric potential is applied to the electrodes 12 and 13, the plane wave front of the input light energy will remain unchanged in its transmission through the optical waveguide 11 and emerge in substantially the same orientation.

However, in response to an applied electric field, the plane wave front of the input light energy may be made to deflect in varying degrees and amounts by reason of its transmission through the optical waveguide 11 of the beam deflector of the present invention in accordance with the instantaneous amplitude of the electric potential applied to the electrodes 12 and 13.

If desired, the preferred embodiment of the present invention may include a suitable optical element such as a positive focal length lens employed to intercept the emergent light energy from the optical waveguide 11 for concentrating it at a desired focal plane where a screen or detector array 16 may, for example, be positioned.

In a multi-mode optical waveguide such as that incorporated in the concept of the present invention the propagation of light can be described as approximately a plane wave as indicated. Since the resistivity in the waveguide is a function of depth, when a voltage is applied to the top electrode and to the bottom low resistivity layer in cubic crystal layers (ZnS, ZnSe, ZnTe for example) oriented with the 100 axis parallel to the $x$ direction, the change in refractive index for light polarized in the y direction may be expressed as:

$$n_y = n_o - \frac{n_o^3}{2} r_{41} E(x)$$

where $n_o$ is the refractive index of the crystal, $r_{41}$ is the electrooptic coefficient and $E(x)$ is found from the varying resistivity by $$E(x) = \frac{\rho c x}{i/A}$$

where $i$ is the current through the crystal, and $A$ is the area. For $\rho(x)$ a linear function of $x$, i.e. for
$$\rho = ax$$
(The index profile may be process dependent as in some diffusions or may be tailored during deposition). The electric field is a linear function of distance; the optical path difference between the top and bottom of the crystal is then $$\Delta\Gamma = axl \frac{n o^3}{2} r_{41}$$

where $l$ is the length of the waveguide. The input plane wave then becomes tilted as it passes through the waveguide emerging at an angle $\alpha$ given by $$TAN^{-1} \alpha = \frac{2}{\lambda} \Delta\Gamma$$

where $\lambda$ is the wavelength of light used.
For small shifts $$\alpha = \frac{2}{\lambda}\Delta\Gamma$$

Placing a lens of focal length $f$ in front of the crystal will focus the light to a point at a distance $f$ from the lens and deflected up or down (depending on the polarity of $E$) by a distance $x'$ given by $$x' \cong 1 \frac{no^3}{2} r_{ij} f.$$

The production of resistivity variations in optical waveguides in II–VI compounds (CdS, ZnSe for example) is well known to be possible by diffusion of cadmium or zinc into these crystals. Several other techniques such as doping during the deposition of the waveguide, ion implanting, or proton bombardment may be used.

Those skilled and knowledgeable in the pertinent arts will readily appreciate the principal advantages of the concept of the present invention over known prior art electro-optic beam deflectors which include significantly increased efficiency due to the fact that the prismatic form of crystal material is inherently more efficient in deflecting a beam than a small grating, for example. Moreover, because of the unique concept of the present invention very large deflections are achieved with relatively very small applied voltages.

Any binary or ternary semiconductor material with which it is possible to fabricate multi-mode waveguides may be employed in the practice of the present invention. Suitable diffusion processes may be employed to develop desired optical waveguide resistivity variations in pervoskite crystals such as lithium niobate. Various techniques such as ion implanation, electron bombardment, and dopant variations during film growth may also be advantageously adapted to fabricate the optical waveguide layer of the present invention with the desired variation in electrical resistivity profile relative to thickness which is an inherent requisite of the concept of the present invention.

Accordingly, it may be readily appreciated that the concept and teaching of the present invention may be practiced by a number of variant methods of fabrication resulting in different embodiments as desired within the concept and teaching of the present invention.

Obviously many modifications and variations of the present invention are possible in the light of the above teachings. It is therefore to be understood that within the scope of the appended claims the invention may be practiced otherwise than as specifically described.

What is claimed is:

1. An optical beam deflector comprising:
   an electrically conductive substrate;
   a multi-mode optical waveguide of electro-optic crystal material supported by said substrate for transmitting polarized light energy along a determinable path,
   said electro-optic crystal material having a gradient variation in electrical resistivity as a function of depth within its thickness;
   a top and bottom electrode disposed with said electro optic crystal material therebetween; and
   a source of electrical potential arranged to be connected to said top and bottom electrode for generating an electric field having a gradient variation commensurate with said gradient variation in electrical resistivity causing a gradient variation in refractive index relative to said thickness for changing the orientation of the plane wave of said light energy responsive to the instantaneous value of said electrical potential.

2. An optical beam deflector as claimed in claim 1 and including a positive focal length lens positioned to intercept the emergent light energy from said optical waveguide for concentration at a desired focal plane.

3. An optical beam deflector as claimed in claim 1 and including an optical buffer layer disposed between said top electrode and said optical waveguide.

4. An optical beam deflector as claimed in claim 1 and including a source of selectively variable electrical potential for controllably varying the disposition of light energy emergent from said optical waveguide.

5. An optical beam deflector as claimed in claim 1 wherein the electro-optic material of said optical waveguide is deposited on said substrate.

6. An optical beam deflector as claimed in claim 1 wherein the electro-optic material of said optical waveguide is diffused into said substrate.

7. An optical beam deflector as claimed in claim 1 wherein the electro-optic material of said optical waveguide is ion-implanted in said substrate.

* * * * *